United States Patent

[11] 3,617,378

[72] Inventor Charles K. Beck
Boulder, Colo.
[21] Appl. No. 861,773
[22] Filed Sept. 29, 1969
[45] Patented Nov. 2, 1971
[73] Assignee International Business Machines Corporation
Armonk, N.Y.

[54] MAGNETIC RECORDING MEDIA
5 Claims, 2 Drawing Figs.

[52] U.S. Cl. .......... 117/226, 117/68, 117/235
[51] Int. Cl. .......... H01f 10/00
[50] Field of Search .......... 117/235, 239, 240, 226, 68

[56] References Cited

UNITED STATES PATENTS

| | | | |
|---|---|---|---|
| 2,819,186 | 1/1958 | Franck | 117/239 |
| 3,184,724 | 5/1965 | Irasek | 117/239 X |
| 3,293,066 | 12/1966 | Haines | 117/240 |
| 3,423,233 | 1/1969 | Akashi et al. | 117/235 |
| 3,440,091 | 4/1969 | Delmore | 117/239 X |

*Primary Examiner*—William D. Martin
*Assistant Examiner*—Bernard D. Pianalto
*Attorneys*—Hanifin and Jancin and Donald W. Margolis

ABSTRACT: This invention discloses a magnetic recording medium in the form of a nonconductive substrate having two surfaces, one surface being coated with a magnetic recording material and the other surface being coated with a composition exhibiting selected properties as to its resistivity and as to its coefficient of friction with regard to its use in a media handling system. Also, a media handling system, including such a magnetic recording media, is disclosed.

INVENTOR
CHARLES K. BECK
BY
HANIFIN AND JANCIN
ATTORNEYS

MAGNETIC RECORDING MEDIA

CROSS-REFERENCES TO RELATED APPLICATIONS

The following applications are assigned to the assignee of the present invention.

U.S. Pat. application Ser. No. 697,716, entitled "Recording and Playback System Incorporating a First Character Positioning System," D. J. Morrison, et al., as inventors, filed Jan. 15, 1968.

U.S. Pat. application Ser. No. 697,735, entitled "Data Reading, Recording and Positioning System," D. E. Clancy, et al., inventors, filed Jan. 15, 1968.

U.S. Pat. application Ser. No.697,717, entitled "Detection and Error Checking System for Binary Data," C. W. Cox, et al., inventors, filed Jan. 15, 1968.

U.S. Pat. application Ser. No. 623,053, entitled "Data System with Printing, Composing, Communications and Magnetic Card Processing Facilities," R. A. Kolpek, inventor, filed Mar. 14, 1967.

U.S. Pat. application Ser. No. 831,948, entitled "Record Card Handling Device with Multiple Feed Paths," D. R. Andrews et al., inventors, filed June 10, 1969.

BACKGROUND OF THE INVENTION

1. Field of the Invention

The present invention relates to magnetic recording media for use in a media handling device, and more particularly to a magnetic recording medium in the form of a discrete member having selected mechanical and electrical characteristics which enable its use in a media handling device. The invention also relates to a media handling system, including such a magnetic recording media.

2. Description of the Prior Art

In the prior art, magnetic recording media consisting of a substrate coated with a magnetic composition and including both antistatic and good frictional characteristics have been taught. Such media has been prepared, for example, by including conductive or antistatic constituents in the magnetic composition itself, or by providing a separate conductive layer either on the back surface of the substrate, or as a separate layer, intermediate the substrate and magnetic layer of the media. The frictional characteristics of media have been adjusted simultaneously with the conductive properties of media by, for example, including both friction controlling particles of silica aerogel and conductive particles of chained carbon black in a single coating on the back of a magnetic recording media substrate. See Haines, U.S. Pat. 3,293,066, assigned to the assignee of the present application. The record media taught by this latter reference is outstanding for use in a high-speed media handling system in which both the static and dynamic coefficients of friction are required to remain constant.

However, the prior art references do not teach a magnetic recording media for use in a relatively slow transport system in which the media is subjected to mechanical actuation and motion with regard to surfaces and driving members having differing frictional characteristics and in which the medium is required to move relative to other media in a manner which generates a static charge.

SUMMARY OF THE INVENTION

In order to provide a record medium for use in a media handling system, which medium has requisite characteristics of coefficient of friction and resistivity, a discrete record medium including a substrate having a magnetic coating on one surface and a coating on its second surface having controlled coefficient of friction with regard to a media handling device environment as well as adequate conductivity is provided. The record medium is preferably in the form of a card. The substrate of the medium may be formed of any suitable nonconductive material, such as paper, or an organic polymeric material. The magnetic coating is preferably of the well known type wherein a magnetic pigment is dispersed in a binder system. The backcoating composition of this invention comprises a binder matrix including conductive material, such as carbon black, and $\alpha$-$Fe_2O_3$ as a novel friction controlling ingredient.

The card handling device includes a receptacle for receiving a plurality of cards in stacked order with the magnetically coated surface of each card up and the backcoated surface of each card down. A picker member is mounted at the bottom of the recepticle. The coefficient of friction between the picker and the backcoating of the bottom card must be such that the card is positively urged into motion upon actuation of the picker. The coefficient of friction between the top magnetic portion of the card which is urged into motion by the picker and the facing backcoat of the next adjacent card must be such as to allow a relatively easy sliding motion between the cards. Once removed from the stack, the card is slidably moved along a working surface during transducing or other operations. The coefficient of friction between the card backcoat and the working surface must be such as to allow an easy sliding motion. Finally, the conductivity of the card must be such that work impeding static electricity, generated by the rubbing action between cards as they are removed from the receptacle, is easily dissipated.

The foregoing and other objects, features and advantages of the invention will be apparent from the following more particular description of the preferred embodiment of the invention, as illustrated in the accompanying drawing.

DESCRIPTION OF THE PREFERRED EMBODIMENTS

Figure 1:
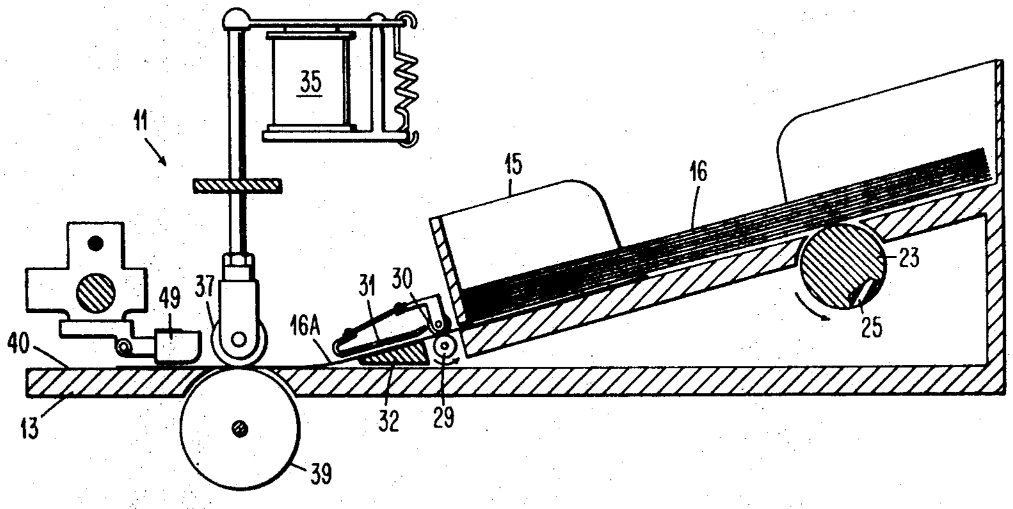
FIG. 1 is a side-elevation view, partly in section, of a device for handling the media of the present invention.

Referring now to FIG. 1, the media handling device 11 comprises a smooth, flat-bed media transport 13 and an input card hopper 15. A detailed description of this media handling system can be found in the above-referenced copending application of D. R. Andrews, et al., A plurality of cards 16 are stacked in card hopper 15, and the bottom most card 16A stack is shown being fed from the card hopper to the card transport 13 at a speed of about 5 inches per second When card picker roller 23 is rotated in a counterclockwise direction. Card picker roller 23 has a resilient material 25 of high coefficient of friction, such as rubber, located on a portion of its cylindrical surface which engages the backcoated surface of bottommost card 16A and causes it to move through continuously rotating drive rollers 29 and 30, and thereafter under card guide 31 and over guide member 32. The card is then positioned for data recording or data playback operation under control of one or more idler roll-drive-roll combinations 37 and 39 which affect reciprocating card motion. This operation is described in detail in the above-referenced, copending application of D. J. Morrison, et al., Each of the one or more drive rolls 39 located on card transport 13 are slightly recessed below their respective transport surface 40 and have no effect on card motion until the corresponding idler roll 37 is actuated down into contact with the card by magnet and armature assembly 35.

Information is magnetically recorded on the card, or read from the card by transducer 49 as the card moves on card transport surface 40 thereunder in accordance with activation of idler roll-drive roll 37 and 39. A detailed description of the recording operation can be found in the above-referenced, copending application of D. E. Clancy, et al., and the detailed description of a reproducing operation can be found in the above-referenced application of C. W. Cox, et al.

As has been described, card motion is affected by picker roll 23 and various sets of drive roll and idler roll combinations 37 and 39. Cards are normally placed in the system in ordered stacks in card hopper 15, and the bottommost card fed to the continuously rotating drive rollers 29 and 30 upon the rotation of card picker roller 23. The high coefficient of friction portion 25 of picker 23 is preferably resislient rubber or a synthetic rubber polymer. Similarly, drive rolls 39 are composed of friction resilient rubber material, although pinch pressure from actuated idler roll 37 renders the coefficient of friction relationship between drive roll 39 and the card noncritical. Card transport table surface 40 is of smooth, hard material, such as finished metal or plastic. Machined aluminum is preferred for this surface.

Tests have shown that, in order for a magnetic card 16A to be driven by picker roll 23, without adherence of the card to the next adjacently upward card in hopper 15, and in order for a card to be capable of the proper sliding motion over transport surface 40, certain coefficient of friction relationships between the back surface of the card and a magnetic portion of an adjacent card, and between the back surface of the card and both picker roll portion 25 and surface 40, must exist. Extensive mechanical testing has indicated that for this system to operate, the coefficient of friction, $C_m$, between the back surface of a card and the magnetic portion of an adjacent card, must be less than 0.50 , that the coefficient of friction, $C_r$, between the high friction portion of the picker roll and the back of the card must be 0.90, or greater, and that the coefficient of friction, $C_a$, between the card transport surface and the back of the card must be 0.35, or less.

It was further determined that in order for a record media of this type to work properly, it must include certain electrical properties. It was determined that the resistivity of the card should be less than $5\times10^8$ ohms per square in order to dissipate static charges generated by the motion of a card in contact with another card. Also, from a utilitarian point of view, if a backcoat was used to supply the required mechanical and electrical properties, it had to have adequate adhesion to the substrate, and adequate life in the media handling system. Adhesion is tested by using a cellophane adhesive tape type of test common in the paint industry. If no portion of the backcoat is removed by tape which is stuck to it and then removed, adhesion is considered to be good. A backcoat life is tested by actually running the media for a minimum of 500 passes through a media handling apparatus. Again, if no portion of the backcoat is chipped or worn during this test, it is considered to have an adequate life. In addition to good adhesion and adequate life, it was also necessary for the coating to be resistant to damage or breakdown during handling outside of the media handling system.

It was experimentally determined that a card consisting of a nonmagnetic substrate, such as 7-mil polyester film coated on only one surface with a magnetic composition met few of these criteria. Such a card was especially deficient in having too low a coefficient of friction with respect to the picker roll, so that cards did not feed well from the hopper, and too great a static charge buildup, which also impeded the feeding of cards due to mutual attraction between cards. The presence of an electrostatic charge in the cards also impeded other card handling operations and attracted deliterious dirt and debris to the card.

Figure 2:
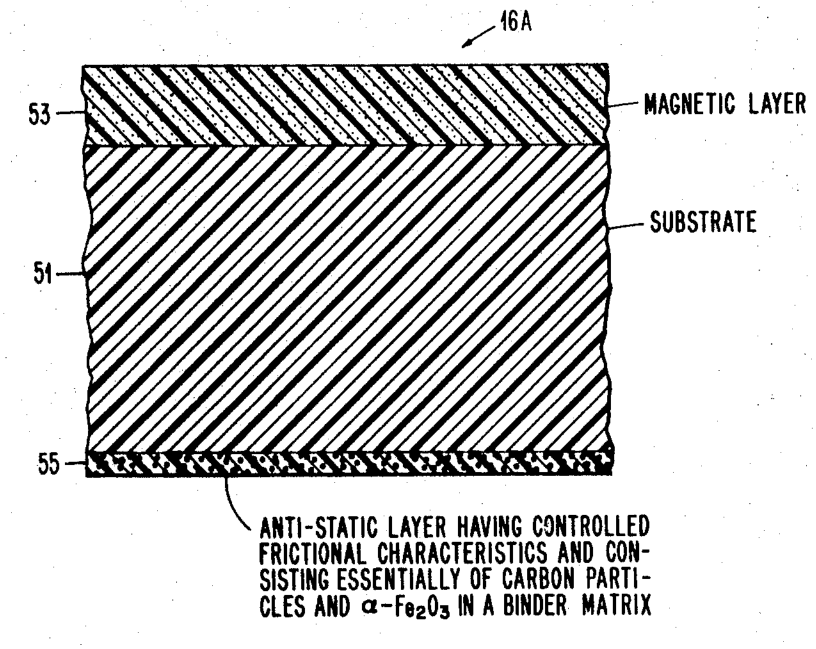
FIG. 2 is an exaggerated sectional view of the friction and conductivity controlled magnetic recording media of the present invention.

A card with a conductive backcoat was decided upon to overcome these shortcomings. However, the backcoat was required to have the anomolous characteristics of increasing friction with one material, the rubberlike portion 25 of picker roll 23, while maintaining a low coefficient of friction with two other materials, the magnetic coating 53 on an adjacent card and the card transport surface 40. Such a media 16A is shown in exaggerated cross section in FIG. 2. Substrate 51 can be any material, but is usually a polymeric material, such as polyester or cellulose material. The illustrated magnetic layer 53 is a uniform mixture of synthetic organic binder and magnetic particles, usually ferromagnetic iron oxide. Layer 55 on the opposite side of substrate 51 from magnetic layer 53 is antistatic layer having controlled frictional characteristics.

The most readily apparent approach to providing a backcoat composition meeting the media handling system's requirements was the preparation of compositions similar to those commonly used in preparing a pigmented magnetic coating. Such a formulation, having the following composition, by weight, was prepared:

| | |
|---|---|
| Vinylidene chloride-acrylonitrile copolymer (Dow Chemical Co., Saran F130) | 65.0% |
| Polyurethane (B. F. Goodrich Chemical Co., Estane 5702Fl) | 7.4% |
| Carbon black particles (Cabot, Inc., Vulcan XC-72) | 25.4% |
| Dispersants and stabilizers | Balance |

This composition, when utilized as a backcoating for a magnetic card media, was found to have sufficiently low resistivity, but was found to be lacking in the required frictional properties. Its coefficient of friction with rubber was 0.6, which was too low, and with aluminum was 0.38, which was too high. This formulation, when tested, was also found to exhibit unsatisfactory adhesion to the substrate.

In an attempt to avoid the frictional shortcomings of the previous formulation, it was modified in accordance with the teaching of the prior art by the addition of 5.1 percent, by weight, of silica aerogel (Cabot, Inc. Cabosil M-15) and by reduction of the amount of carbon black to 19.1 percent, by weight. The resulting formulation was coated to a thickness of 0.2 mil on the back surface of the card media and tested. It was found exhibit electrical and mechanical characteristics within the required range. However the formulation was found to be unsuitable as its adhesion to the substrate and resistance to wear were quite poor.

In an attempt to obtain a coating formulation which would be properly adherent and wear resistant, the previous coating formulation was further modified by substituting vinylchloride-vinylidene chloride copolymer (B. F. Goodrich Chemical Co., Geon 222) as the sole binder constituent for the silica aerogel and carbon black particles. Once more, the resultant coating met the necessary mechanical and electrical requirements, but failed to exhibit suitable adhesion to the substrate.

In view of the foregoing experiments, it was decided that other less obvious approaches were required in order to obtain a coating having the required electrical, mechanical, life, adhesion, and wear characteristics. In a new approach, a media binder of the polyurethane and vinyl type was prepared, substituting nonmagnetic $\alpha$-$Fe_2O_3$ for the $\gamma$-$Fe_2O_3$ normally utilized in a magnetic media composition. The resulting formulation included, by weight, about 6 percent carbon black particles and about 68 percent $\alpha$-$Fe_2O_3$. When coated and dried, the composition was found to be unsuitable as it had a resistivity several orders of magnitude higher than that which was operable in the present media handling system. In order to decrease the resistivity obtained the previously noted formulation, the amount of carbon black was doubled. The resulting coating exhibited such poor cohesion and adhesion that it was found to be entirely unsuitable for use in the system.

In an attempt to improve the adherence of the formulation, the amount of $\alpha$-$Fe_2O_3$ was reduced to about 40 percent, by weight, and the carbon black particles increased to about 20 percent, by weight. This formulation was then coated on the substrate to a dry thickness of about 0.1 mil. The resulting backcoat was found to satisfy all requirements as to resistivity and coefficient of friction, as well as to adhesion, and life in the media handling device. However, in ordinary handling of the cards, the backcoat was found to deteriorate and wear excessively.

When formulation was coated to a dry thickness of 0.2 mil it was found to meet all operating specifications. It was found to have a resistivity of $3.2\times10^5$ ohms per square, a coefficient of friction with a magnetic media surface, $C_m$, of 0.39, a coefficient of friction with rubber, $C_r$, of 1.27, and a coefficient of friction with aluminum, $C_f$, of 0.30. Cards backcoated with this formulation were also found to work suitably in the media handling device for more than 650 passes without showing signs of failure, and their wear characteristics were also excellent.

The composition of this formulation, by weight, was as follows:

| | |
|---|---|
| Polyurethane (Mobay Chemical Co., Mondur CB-75, Polyester-Multron R-16 reaction product) | 12.9% |
| Polyvinyl chloride-polyvinyl acetate (Union Carbide, Bakelite VAGH-1) | 18.5% |
| Acrylonitrile-butadiene (B. F. Goodrich, Hycar 1432) | 7.4% |
| Carbon black (Columbia Ribbon and Carbon Mfg. Co., Conductex SC) | 18.4% |
| α-Feobd 2O, (Columbia Ribbon and Carbon Mfg. Co., Mapico Red 516 Medium) | 37.8% |
| Lubricants and dispersants | Balance |

Further experimentation with this formulation indicated that coatings having thicknesses in the range of slightly more than 0.1 mil met all electrical and mechanical criteria and also showed suitable resistance to handling. The upper limit of the coating's thickness is dictated only by the needs of the media and the coating equipment available.

Any stable polymeric binder formulation having requisite characteristics may be successfully substituted for that of the above preferred example so long as it is coated to a thickness which provides the essential quality of wear. Generally speaking, the many well-known and reported magnetic media binder systems may be used. Similarly, any of the well-known magnetic media coating systems may be utilized to provide magnetic layer 53. One such preferred composition is of the same character as the preferred antistatic backcoat system, with insignificant polymer content variations, and with the exception that it includes about 70 percent, by weight, of magnetic $\gamma$-$Fe_2O_3$ or $Fe_3O_4$ in place of nonmagnetic $\alpha$-$Fe_2O_3$, and only about 6 percent, by weight, of carbon particles.

As previously noted, the substrate material 51 may be any suitable nonconductive material. The choice of substrate material may, of course, influence the choice of polymeric binder. Conventional techniques of prewashing or pretreating the substrate, or treating it with electrical discharge, or with a precoat may be employed where problems of adhesion between the substrate and coatings exist.

The choice of conductive materials incorporated in the backcoat is generally not limited to carbon black or any particular form of carbon. At this point in the development of the art, many types of carbon and graphite materials are known, their electrical properties reported, and the techniques for incorporating them in a binder matrix a matter of ordinary skill. Generally speaking, amounts of carbon from about 4 percent to 50 percent, by weight, may be incorporated in the backcoat of the disclosed media to provide adequate conductivity without causing adhesion or wear problems. Other nonmagnetic conductive particles are also useful for the required purpose of controlling the resistivity of the media.

Unlike the conductive particles, the choice and amount of friction control particles used in the present invention is more restricted. As previously noted, nonmagnetic $\alpha$-$Fe_2O_3$ is the sole particle found to meet the needs of the media and system, and it cannot be used in amounts greater than about 40 percent, by weight, if adequate adhesion of the backcoat on an untreated substrate is to be achieved. Reduction of the $\alpha$-$Fe_2O_3$ to as low as about 8 percent, by weight, is within the scope of this invention.

The present invention thus provides a magnetic recording medium for use in a media handling system, which medium has selected mechanical and electrical characteristics which make possible its use within the system. Without these properties, the media and the system would be inoperative. While the preferred form of the media is a card, it is readily apparent that the system may be modified to require strips, loops, tapes, or other forms of media and the form of the medium modified accordingly.

While the invention has been particularly shown and described with reference to preferred embodiments thereof, it will be understood by those skilled in the art that various changes in form and details may be made therein without departing from the spirit and scope of the invention.

What is claimed is:

1. A magnetic record medium comprising:

a nonmagnetic substrate having two faces;

a magnetic layer covering one face of said substrate; and a wear resistant antistatic and friction controlled coating securely adhered to the second face of said substrate, said coating consisting essentially of conductive particles and particles of nonmagnetic $\alpha$-$Fe_2O_3$ dispersed in a binder matrix of polymeric material, said $\alpha$-$Fe_2O_3$ particles constituting about 8 percent to about 40 percent, by weight, of the said antistatic and friction controlled coating, and said coating having a thickness greater than about 0.1 mil.

2. The magnetic record medium defined in claim 1 wherein the conductive particles are carbon black.

3. The magnetic record medium defined in claim 1 wherein the magnetic layer comprises magnetic particles dispersed in a binder matrix.

4. The magnetic record medium defined in claim 1 wherein the substrate is a polyester.

5. A magnetic record medium for use as one of a stacked plurality of such media in a media handling system, said system including a resilient medium actuator for removing a medium from a media stack and a smooth hard transport surface upon which the medium is moved in sliding contact, said record medium comprising:

A nonmagnetic substrate having two faces;

a magnetic layer covering one face of said substrate; and a wear resistant antistatic and friction controlled coating securely adhered to the second face of said substrate, said coating consisting essentially of conductive particles and particles of nonmagnetic $\alpha$-$Fe_2O_3$ dispersed in a binder matrix of polymeric material, said $\alpha$-$Fe_2O_3$ particles constituting about 8 percent to about 40 percent, by weight, of the said antistatic and friction controlled coating, and said coating having a thickness greater than about 0.1 mil, a coefficient of friction with the resilient medium actuator of at least 0.90, a coefficient of friction with the transport surface of less than 0.35, a coefficient of friction with the magnetic layer of an adjacently stacked magnetic record medium of less than 0.05, and a resistivity no greater than $5\times10^8$ ohms per square.

* * * * *

PO-1050
(5/69)

UNITED STATES PATENT OFFICE
CERTIFICATE OF CORRECTION

Patent No. 3,617,378 Dated November 2, 1971

Inventor(s) Charles K. Beck

It is certified that error appears in the above-identified patent and that said Letters Patent are hereby corrected as shown below:

IN THE CLAIMS

Claim 5, line 60 After "less than" delete "0.05," and substitute therefor --0.50--.

Signed and sealed this 30th day of May 1972.

(SEAL)
Attest:

EDWARD M.FLETCHER,JR.
Attesting Officer

ROBERT GOTTSCHALK
Commissioner of Patents